US009649924B2

(12) United States Patent
Nakaoka et al.

(10) Patent No.: US 9,649,924 B2
(45) Date of Patent: May 16, 2017

(54) WORK/UTILITY VEHICLE

(71) Applicant: KUBOTA CORPORATION, Osaka (JP)

(72) Inventors: Yuki Nakaoka, Osaka (JP); Takashi Kuramoto, Osaka (JP); Akira Tominaga, Osaka (JP); Kodai Tateishi, Osaka (JP); Takeshi Tsuchiya, Osaka (JP)

(73) Assignee: KUBOTA CORPORATION, Osaka (JP)

( * ) Notice: Subject to any disclaimer, the term of this patent is extended or adjusted under 35 U.S.C. 154(b) by 0 days.

(21) Appl. No.: 14/014,604

(22) Filed: Aug. 30, 2013

(65) Prior Publication Data
US 2014/0345964 A1    Nov. 27, 2014

(30) Foreign Application Priority Data

Mar. 22, 2013  (JP) ................. 2013-060641

(51) Int. Cl.
| B60K 5/00 | (2006.01) |
| B60K 17/00 | (2006.01) |
| B60K 5/04 | (2006.01) |
| B60G 3/20 | (2006.01) |
| B60K 17/10 | (2006.01) |
| B60K 17/344 | (2006.01) |
| B60K 13/04 | (2006.01) |

(52) U.S. Cl.
CPC ............... *B60K 5/04* (2013.01); *B60G 3/20* (2013.01); *B60K 17/10* (2013.01); *B60K 17/344* (2013.01); *B60G 2200/144* (2013.01); *B60G 2204/1222* (2013.01); *B60G 2300/124* (2013.01); *B60G 2300/13* (2013.01); *B60K 13/04* (2013.01); *B60K 2005/003* (2013.01); *B60Y 2200/20* (2013.01); *B60Y 2200/22* (2013.01)

(58) Field of Classification Search
USPC ........................ 180/291, 292, 298, 299, 312; 280/124.152, 785
See application file for complete search history.

(56) References Cited

U.S. PATENT DOCUMENTS 3,599,742 A * 8/1971 Lowery ................ B62D 25/105
180/9
5,954,364 A * 9/1999 Nechushtan ............ B60R 21/13
280/781

(Continued)

FOREIGN PATENT DOCUMENTS

| JP | 2009-067081 | 4/2009 |
| JP | 4606290 | 10/2010 |

*Primary Examiner* — Frank Vanaman
(74) *Attorney, Agent, or Firm* — Greenblum & Bernstein, P.L.C.

(57) ABSTRACT

A work or utility vehicle utilizing a drive source, a vehicle body frame, left and right front wheels supported on the vehicle body frame and left and right rear wheels supported on the vehicle body frame. A transmission case is supported on the vehicle body frame and transmits a driving force from the drive source to at least the left and right rear wheels. A guard member protects the transmission case. A stabilizer is supported at two ends by suspension arms of the left and right rear wheels. The guard member is arranged on a rear side of the transmission case and the stabilizer is arranged forwardly of the guard member.

19 Claims, 16 Drawing Sheets

(56) References Cited

U.S. PATENT DOCUMENTS

| | | | |
|---|---|---|---|
| 6,276,484 B1 * | 8/2001 | Evans et al. | 180/291 |
| 6,981,695 B1 * | 1/2006 | Hedlund et al. | 254/323 |
| 7,258,192 B2 * | 8/2007 | Davis et al. | 180/312 |
| 7,591,472 B2 | 9/2009 | Kinjyo et al. | |
| 8,181,731 B2 | 5/2012 | Bessho et al. | |
| 8,469,137 B2 | 6/2013 | Fujii | |
| 2003/0102694 A1 * | 6/2003 | Rondeau et al. | 296/195 |
| 2006/0066136 A1 * | 3/2006 | Kobayashi et al. | 296/203.01 |
| 2009/0091101 A1 * | 4/2009 | Leonard et al. | 280/638 |
| 2011/0240393 A1 * | 10/2011 | Hurd et al. | 180/233 |
| 2012/0223500 A1 * | 9/2012 | Kinsman et al. | 280/124.153 |

* cited by examiner

WORK/UTILITY VEHICLE

CROSS-REFERENCE TO RELATED APPLICATIONS

The present application claims priority under 35 U.S.C. §119 of Japanese Application No. 2013-060641, filed on May 22, 2013, the disclosure of which is expressly incorporated by reference herein in its entirety.

BACKGROUND OF THE INVENTION

1. Field of the Invention

The present invention relates to a work, working and/or utility vehicle. More specifically, the present invention relates to improving a configuration of a rear portion of a vehicle body.

2. Description of Related Art

Japanese Patent No. 4606290 teaches a configuration in which pairs of left and right front wheels and rear wheels are supported in an independent suspension style on a vehicle body frame of a small vehicle used for a golf cart or the like as a work vehicle. Specifically, the configuration includes a pair of left and right center frames in lower positions and a pair of left and right rear frames in upper positions. The configuration includes a vertically oriented front arm support frame and rear arm support frame connected to the center frames and rear frames. An upper arm and lower arm of a rear wheel suspension are supported in a swingable manner with respect to the front arm support frame and the rear arm support frame.

Japanese Patent No. 4606290 teaches a configuration in which the rear arm support frame includes a stabilizer bracket, a horizontally oriented stabilizer cross portion is supported in a swingable manner on the stabilizer bracket, and arm portions at both ends of the stabilizer are connected via a joint to the upper arm of the rear wheel suspension.

Japanese Patent Laid-open Publication No. 2009-67081 teaches a configuration in which pairs of left and right front wheels and rear wheels are included on a vehicle body frame of a multipurpose vehicle used as a work vehicle. The configuration includes an engine, a hydrostatic continuously variable transmission, a transmission, and the like at a rear position of the vehicle body. In Japanese Patent Laid-open Publication No. 2009-67081, the engine, hydrostatic continuously variable transmission, and the transmission are supported on an auxiliary frame at a rear position of the vehicle body frame.

In Japanese Patent Laid-open Publication No. 2009-67081, the transmission has a structure in which a rear wheel axle case extends in a left-right direction and the rear wheels are provided on the extended ends of the rear wheel axle case. A rear suspension is configured by the auxiliary frame being supported in a vertically oscillating manner on the vehicle body frame via a plurality of arms, by a lower end of a damper being connected to the auxiliary frame, and by action of a biasing force of a coil spring.

In the vehicle in Japanese Patent No. 4606290, the rear arm support frame includes a stabilizer bracket on a front surface thereof. By supporting the arm portion of the stabilizer on the stabilizer bracket, the stabilizer is arranged in a space on an upper side of the center frame and on a lower side of the rear frame.

However, when considering a configuration in which the transmission case and the like are arranged at a rear position of the vehicle body, as disclosed in Japanese Patent Laid-open Publication No. 2009-67081, the transmission case and the like are arranged in a space occupied by the stabilizer, thus interfering with the placement of the stabilizer. Further, in a configuration where a space is formed in the rear portion of the vehicle body between the transmission case and the frames, it is possible to arrange the stabilizer in this space. However, the stabilizer is inserted through the space and so assembly of the vehicle is likely to require time and effort.

Further, in a configuration where the transmission case or the like is arranged at a rear position of the vehicle body, as disclosed in Japanese Patent Laid-open Publication No. 2009-67081, when an entire length of the vehicle body frame is shortened due to an objective to reduce weight or size, for example, the transmission case protrudes backward from the vehicle body frame, thus requiring protection for the transmission case.

SUMMARY OF THE INVENTION

A purpose of the present invention is to reasonably configure a work vehicle capable of easily positioning a stabilizer and protecting a transmission case even when the transmission case is arranged in a rear end portion of a vehicle body frame.

One aspect of the present invention provides a drive source; a vehicle body frame; left and right front wheels supported on the vehicle body frame; left and right rear wheels supported on the vehicle body frame; a transmission case supported on the vehicle body frame, speed changing a driving force from the drive source, and transmitting the driving force to the left and right rear wheels; a guard member protecting the transmission case; and a stabilizer supported at two ends by suspension arms of the left and right rear wheels. The guard member is provided to a rear of the transmission case and the stabilizer is arranged forward of a rear position of the guard member.

According to this configuration, the guard member is arranged to the rear of the transmission case. Therefore, even in a configuration where the transmission case protrudes backward from the rear end of the vehicle body frame, for example, the guard member is able to protect the rear end of the transmission case. Further, the stabilizer is arranged forward of the guard member. Therefore, the stabilizer can be arranged, for example, in a space between the rear end of the transmission case and a front surface of the guard member; in a space on a front side of the guard member and a lower side of the transmission case; or in a space lower than a lower end of the guard member. Thus, a work vehicle is configured capable of easily positioning the stabilizer and protecting the transmission case even when the transmission case is arranged at a rear end portion of the vehicle body frame.

The present invention may also be configured by arranging the stabilizer on a lower side of the guard member.

The stabilizer can thus be arranged in a wide open space forward of the rear position of the guard member and below the lower side of the guard member. As a result, the work of assembling the work vehicle can be performed more efficiently.

The present invention may also be configured such that the guard member is formed having the shape of a plate and includes stays protruding forward on two end portions in a left-right direction, and such that the stays are detachably connected to the vehicle body frame.

The protection of the rear end of the transmission case, with the plate-shaped guard member, thus becomes possible over a wide area, the guard member being provided to the rear of the transmission case in a state where the stays are connected to the vehicle body frame. In addition, by separating the stays from the vehicle body frame, space backward of the transmission case can be wide open and maintenance of the transmission case can be readily performed.

The present invention may also support a horizontally and laterally oriented middle portion of the stabilizer in a manner rotatable about a horizontally oriented lateral twist axis, the middle portion of the stabilizer being supported by holders provided to the vehicle body frame.

The stabilizer can thus be stably supported with respect to the vehicle body frame via the holders, and in a case where the rear wheels displace in an up-down direction, the up-down movement of the rear wheels can be alleviated by elastic deformation of the stabilizer centered on the horizontally oriented twist axis in a state supported by the holders.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein.

DETAILED DESCRIPTION OF THE INVENTION

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the forms of the present invention may be embodied in practice.

(Overall Configuration)

Figure 1:
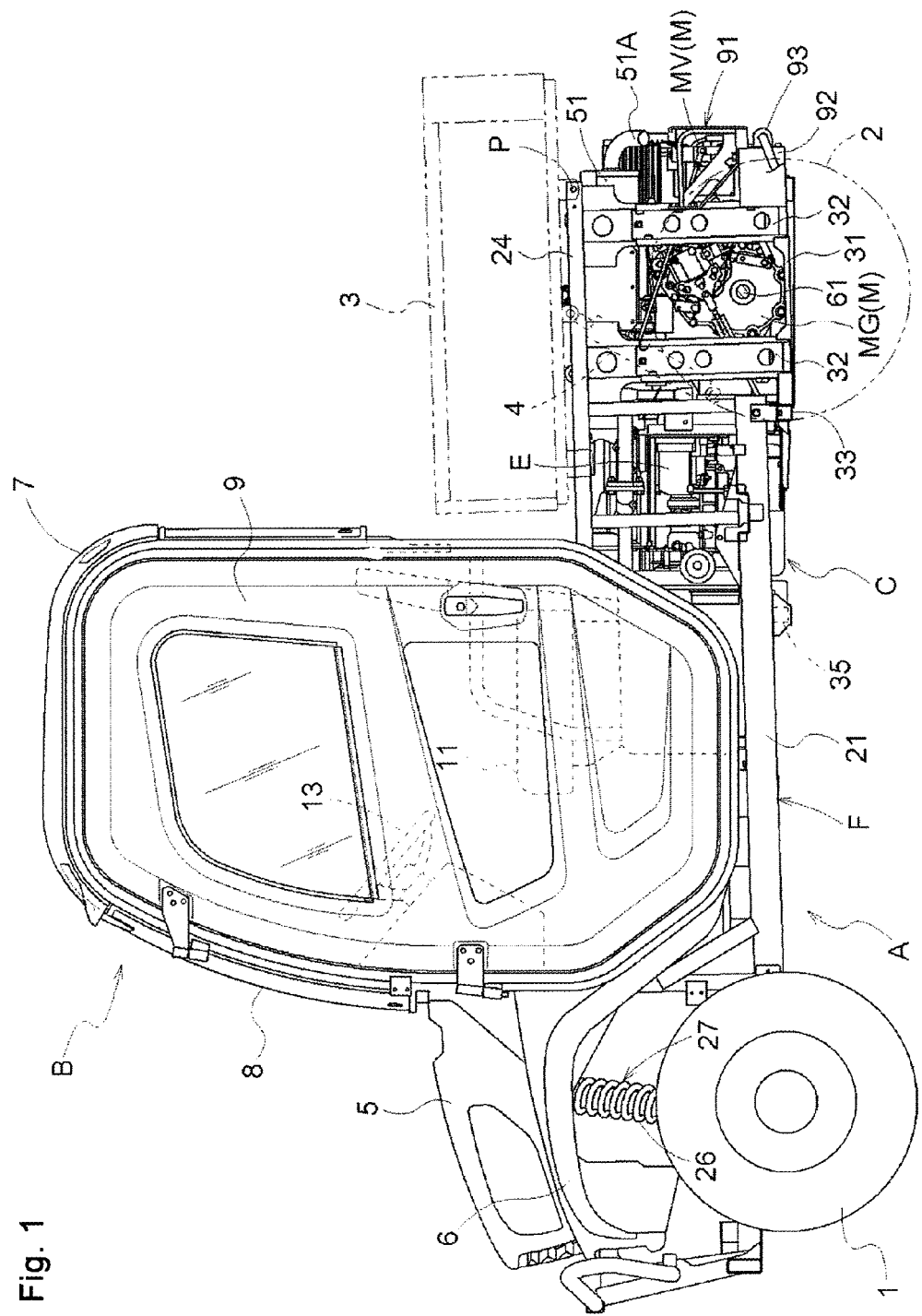
FIG. 1 is an entire side view of a work vehicle.
Figure 2:
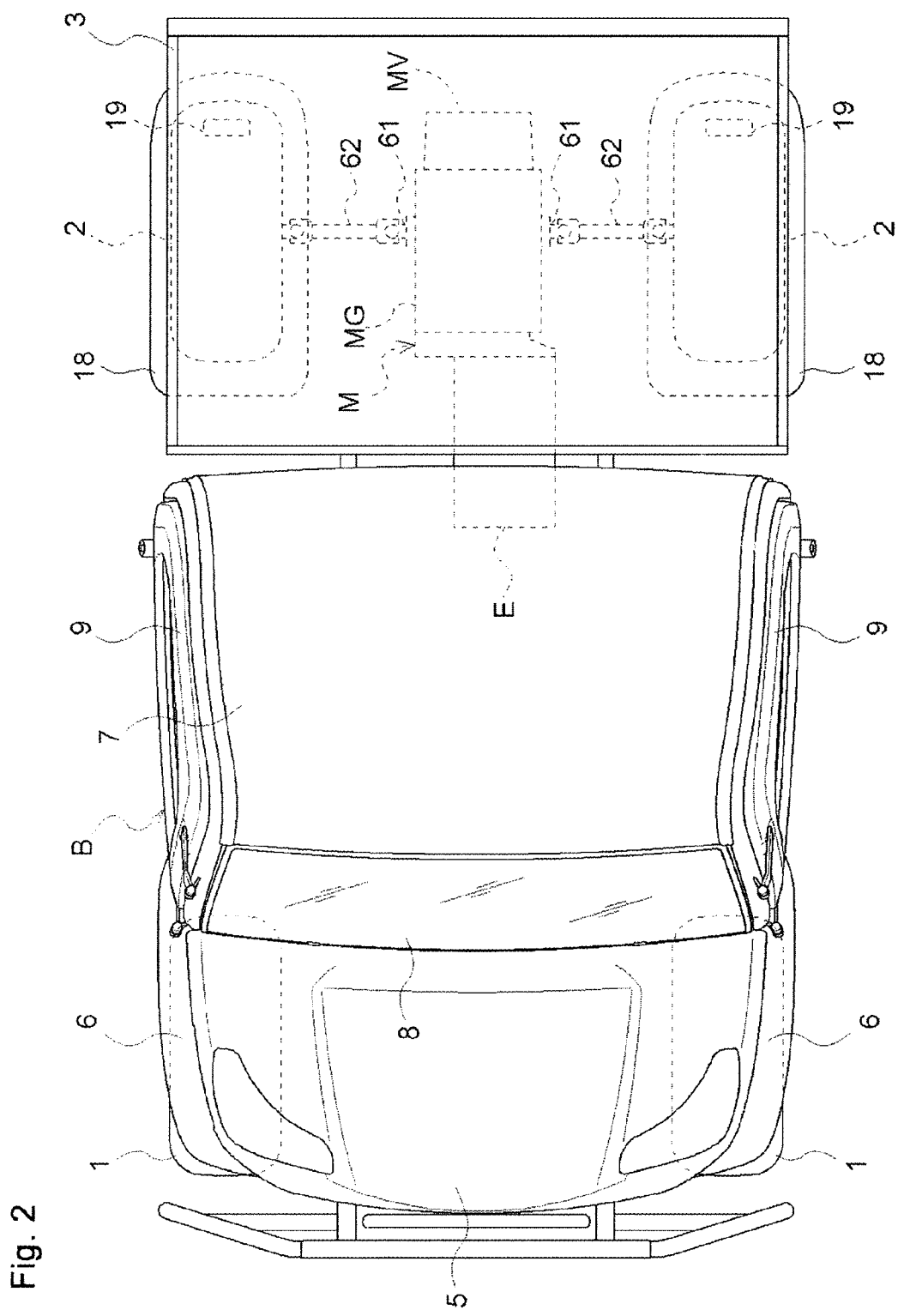
FIG. 2 is an entire top side plan view of the work vehicle.
Figure 3:
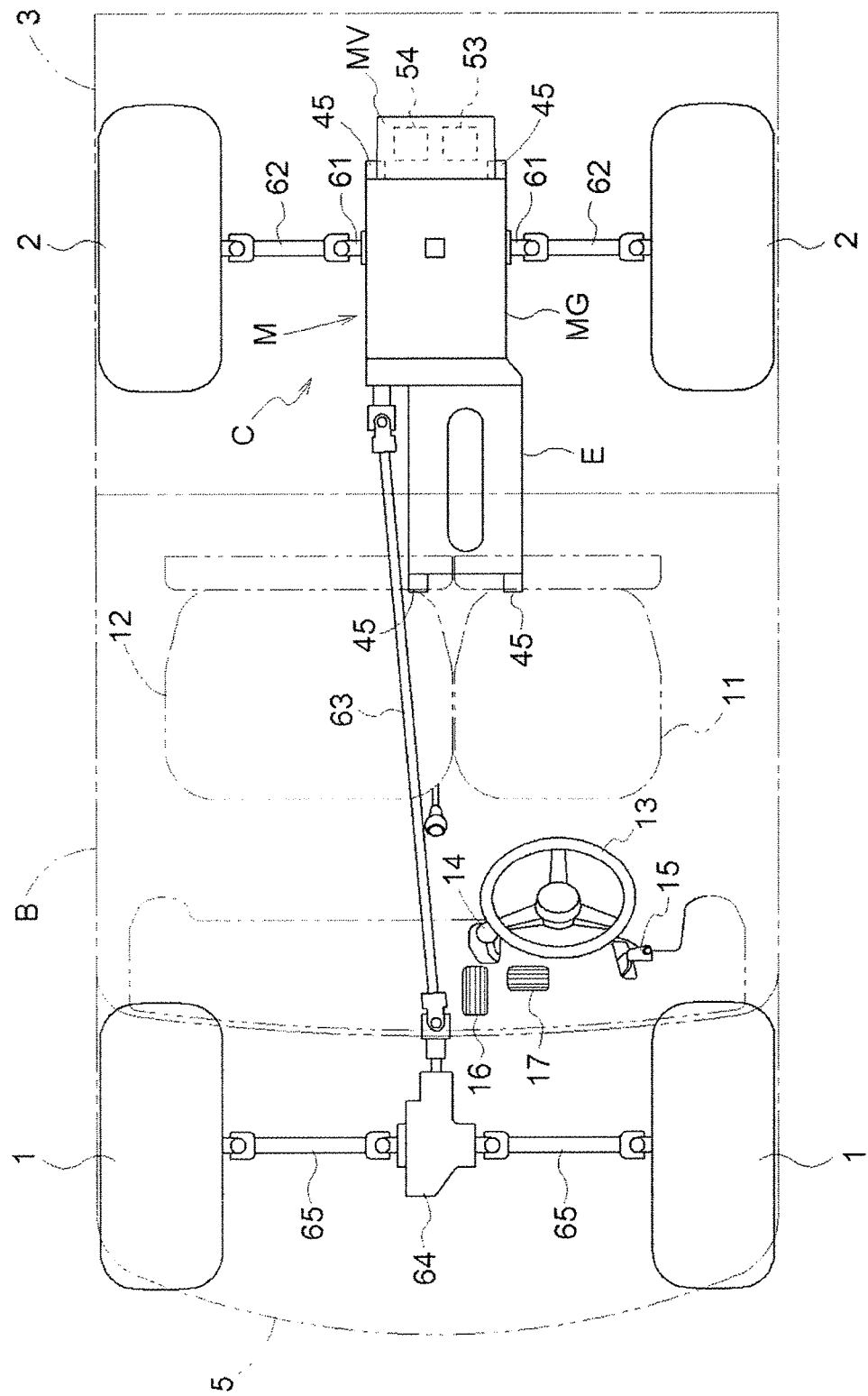
FIG. 3 is a plan view illustrating a transmission system of the work vehicle.

FIGS. 1-3 illustrate main aspects of a work vehicle configured in which a traveling vehicle body A is provided with a pair of freely steerable left and right front wheels 1 and a pair of left and right rear wheels 2. A cabin B constituting an operating unit is provided at a front position of the traveling vehicle body A. A cargo bed 3 is provided to a rear portion of the traveling vehicle body A. A drive unit C is provided at a position below the cargo bed 3.

The work vehicle is of a four-wheel drive type that has a travel drive system transmitting a driving force from the drive unit C to the front wheels 1 and the rear wheels 2, and is configured as a utility vehicle used for multipurpose work such as agricultural and transportation work. The cargo bed 3 can thus be configured in a manner that a rear end side of the cargo bed 3 is supported in a swingable manner about an axis P, i.e., in a lateral orientation with respect to a rear end position of the traveling vehicle body A. The front end side of the cargo bed 3 can be raised via operation of a dump cylinder 4 to unload a load backward.

A hood 5 operable to open and close is provided at a front position of the traveling vehicle body A, and front fenders 6 covering or above the front wheels 1 are arranged at the lower left and right of the hood 5. The cabin B is provided with a windshield 8 at a front portion of a cabin body 7 and doors 9 operable to open and close with respect to lateral sides of the cabin body 7.

The cabin B includes a driver seat 11 on which a driver sits and a laterally-long two-seater assistant seat 12 adjacent to the driver seat 11. Further, at positions in front of the driver seat 11, the cabin B is provided with a steering wheel 13 to allow for steering/controlling the front wheels 1. A main speed change lever 14, and a parking lever 15 are also utilized. At lower positions thereof, the cabin B includes an accelerator pedal 16 which functions as a speed change operation device for controlling a traveling speed of the vehicle, as well as a brake pedal 17 operating brake devices (not illustrated in the drawings) of the front wheels 1 and the rear wheels 2.

Additionally, rear fenders 18 covering or above the left and right rear wheels 2 are provided at a rear end side of the traveling vehicle body A. Brake lights 19 are provided on the rear fenders 18.

(Vehicle Body Frame)

Figure 4:
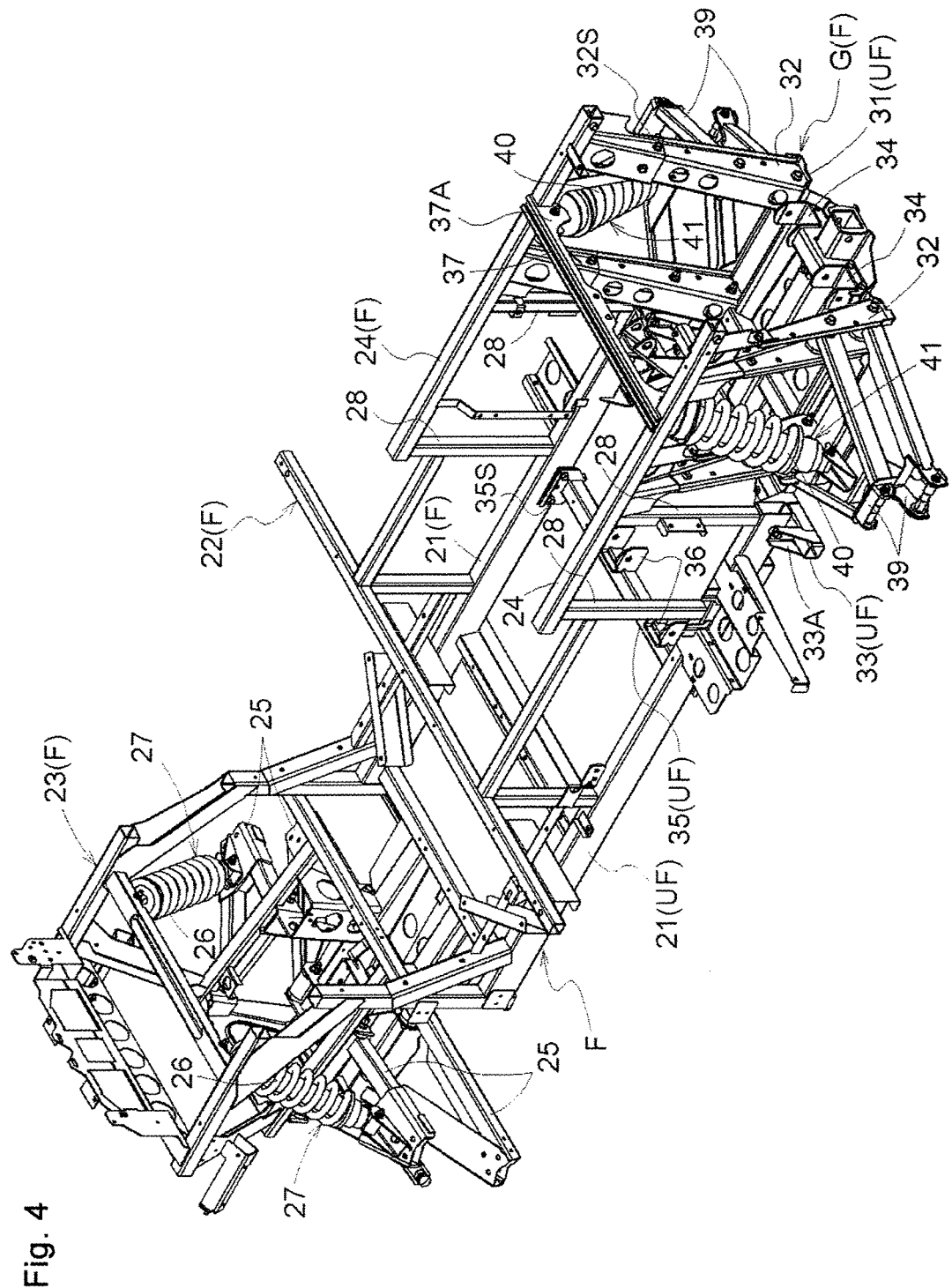
FIG. 4 is a perspective view of a vehicle body frame.

A vehicle body frame F is provided as a strength member or support system of the traveling vehicle body A. As shown in FIG. 4, the vehicle body frame F is configured to include a pair of left and right main frames or frame members 21 extending in a longitudinal or front to back direction. A cabin frame unit 22 supports the cabin B at a front position of the main frames 21. A front frame unit 23 connects front ends of the main frames 21. A pair of left and right upper frames or frame members 24 are located at positions above a rear position of the main frames 21, and extend in the longitudinal direction of the traveling vehicle body A in a manner parallel to the main frames 21. A detachable frame unit G supports the drive unit C.

Rectangular or square-shaped steel pipes can be used for the main frames 21 and the upper frames 24, and steel products such as squared pipes and channels can be used for the cabin frame unit 22 and the front frame unit 23.

The cabin frame unit 22 is configured as a structure that includes a frame body in a lateral orientation arranged at a front portion of the cabin B and a frame body in a lateral orientation arranged at a lower side of the driver seat 11. The front frame unit 23 is a structure arranged at a lower side of the hood 5, and, at each of a left and right position of the front frame unit 23, base end portions of a pair of upper and lower front suspension arms 25 configured as of a double wishbone type are supported in a manner swingable about longitudinally oriented swing axes. Further, lower ends of front suspension units 27 are supported by the front suspension arms 25. The front suspension units 27 have front suspension springs 26 that are compressed when the front suspension arms 25 swing upward. Upper ends of the front suspension units 27 are supported by the front frame unit 23.

The left and right main frames 21 and the upper frames 24 that are arranged above the main frames 21 are connected by vertically oriented connecting frames 28 that are formed using square-shaped steel pipes. Further, at a position adjacent to a rear end side of the main frames 21 and at a lower side of the upper frames 24, the detachable frame unit G is arranged in a manner separably connected to the main frames 21 and the upper frames 24.

Figure 5:
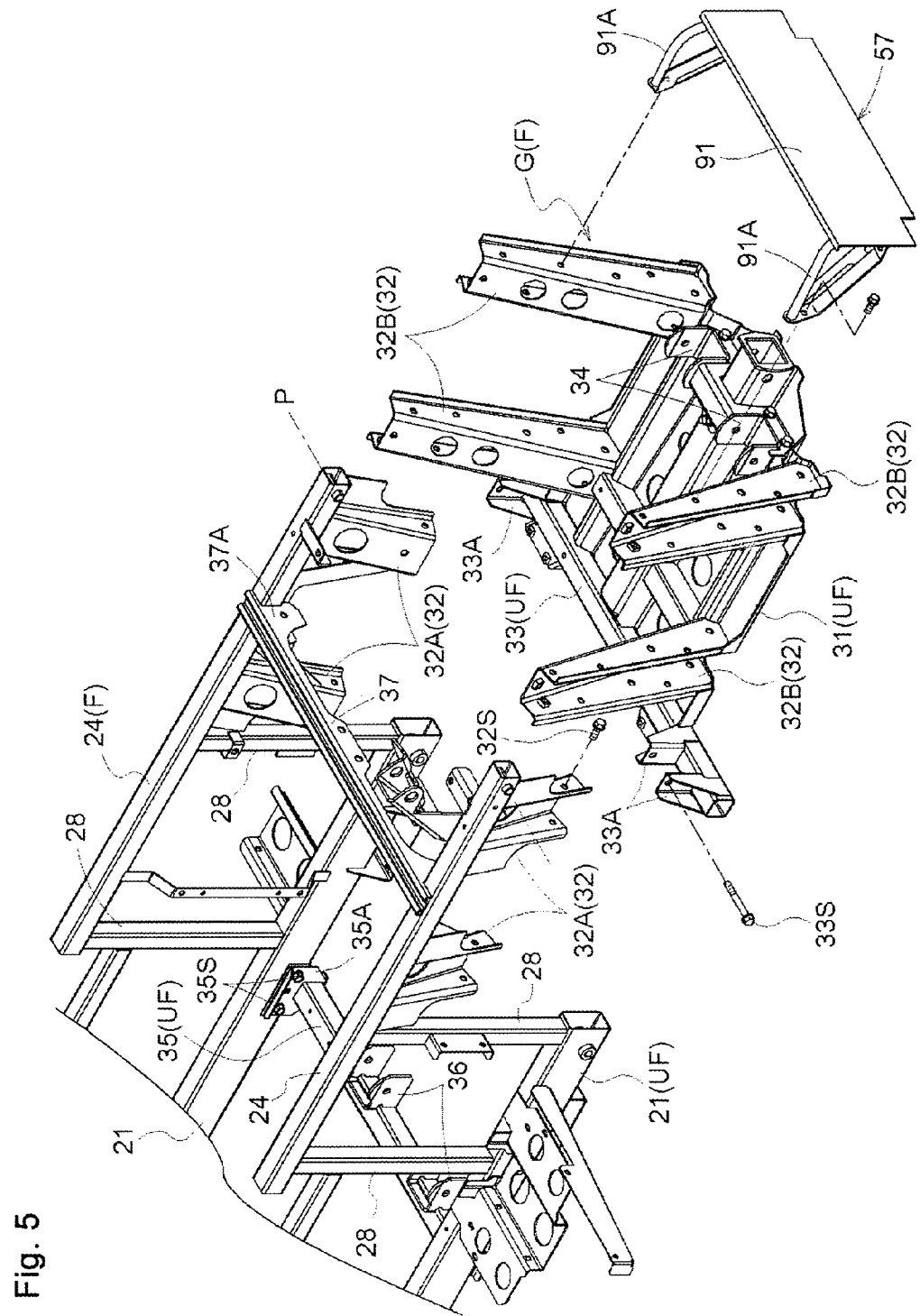
FIG. 5 is a perspective view illustrating a detachable frame unit of a rear portion of the vehicle body frame.
Figure 6:
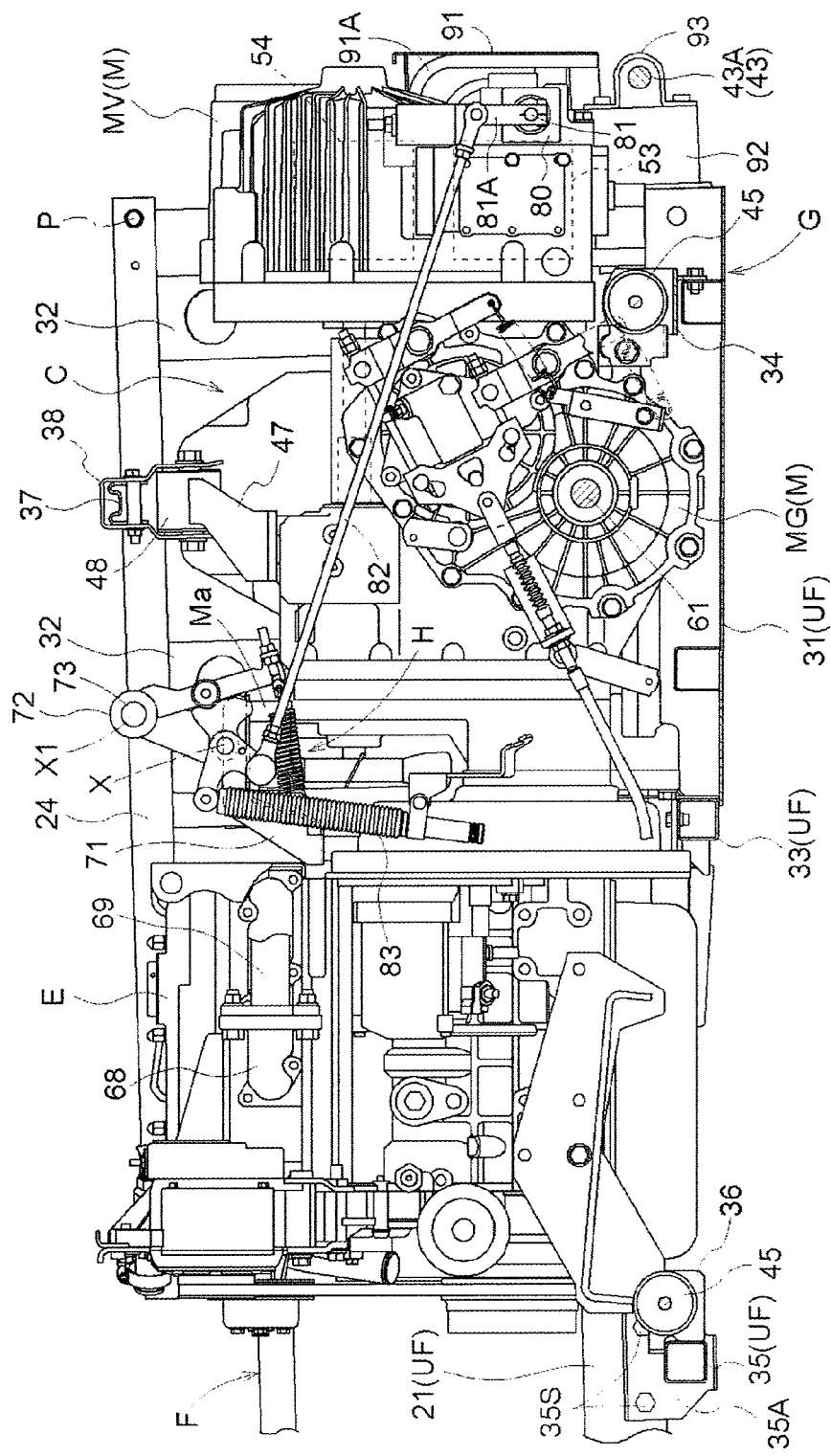
FIG. 6 is a side view of a drive unit.

As shown in FIG. 6, the drive unit C has a configuration in which an engine E functioning as a drive source is connected with a transmission case M. Further, the transmission case M is configured by connecting together a transmission gear case MG and a continuously variable transmission MV. As seen in FIGS. 5 and 6, the detachable frame unit G is configured to include a mount frame 31 arranged at a lower side of the drive unit C (lower than the upper frames 24). Two vertical frames 32 are arranged on each of a left and right side of the mount frames 31 and connect the mount frames 31 to the left and right upper frames 24. The vertical frames 32 have a squared U-shaped cross-sectional shape. A front frame 33 in a lateral orientation is formed at a front end side of the mount frame 31.

The detachable frame unit G also has a functional capability of supporting the rear wheels 2, as is described later on, and is configured in a manner that makes it detachable from the vehicle body frame F by separating the detachable frame unit G from the other frames, i.e., in a state in which the drive unit C and the rear wheels 2 are supported by the detachable frame unit G.

The mount frame 31 is formed by press working (bending), such as punch press working, a steel plate and is formed with rib-like portions formed thereon to increase strength. The mount frame 31 has a lateral width set to be shorter than a lateral distance between the left and right upper frames 24. The mount frame 31 is provided with a pair of left and right rear mount supports 34 to support the transmission gear case MG. Further, in order to linearly connect two end portions of the mount frame 31 and the upper frames 24 via the vertical frames 32, the left and right vertical frames 32 can be provided in an inclined manner such that an upper end side is increasingly displaced toward the outside of the vehicle body.

Figure 8:
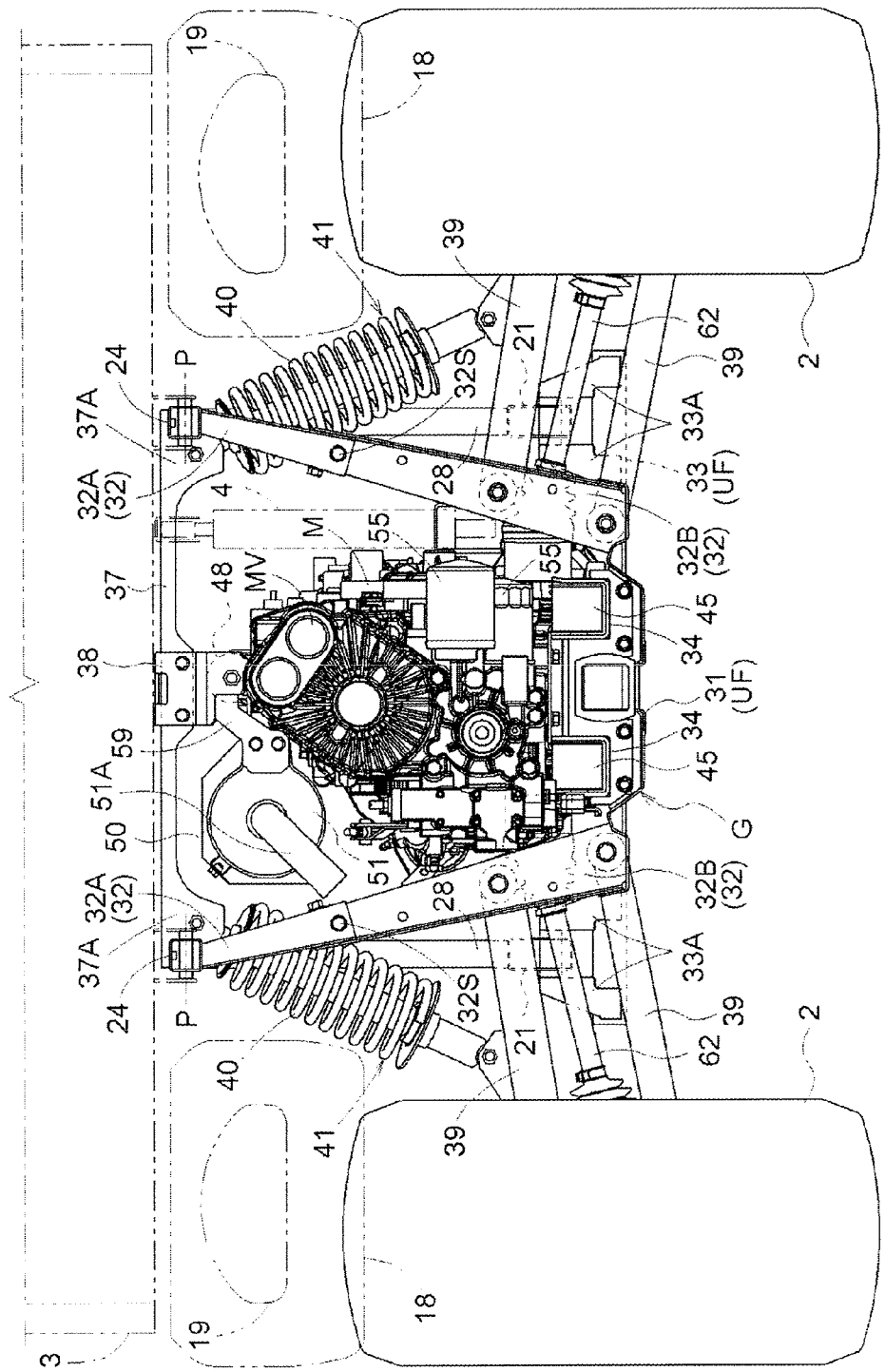
FIG. 8 is a rear view of a traveling vehicle body.

As FIGS. 4, 5 and 8 illustrate (when viewed in the longitudinal direction), the illustrates arrangement provides for a pair of left and right upper frames 24 at an upper portion, and the mount frame 31 (which is an example of an underframe UF) at a lower portion, and the vertical frames 32 at two sides in an inclined manner such that an upper side is increasingly displaced toward the outside of the vehicle body, when an imaginary line connecting upper ends of the left and right vertical frames 32 is used as an upper base and an imaginary line connecting lower ends of the left and right vertical frames 32 is used as a lower base, respective positional relationships are configured in such a manner that an inverted trapezoid is formed of which the upper base has a longer length than the lower base.

The vertical frames 32 are formed using channel-shaped steel and have a configuration in which upper members 32A, upper ends of which are connected to the upper frames 24, and lower members 32B, lower ends of which are connected to the mount frame 31, are separably or detachably connected to one another. A portion of an upper member 32A and a portion of a lower member 32B are overlapped, and such overlapping portions are separably connected to one another by inserting connecting bolts 32S through the overlapping portions. Further, brackets 33A are provided at two end portions of the front frame 33 and, by inserting insertion bolts 33S through the brackets 33A, the front frame 33 is separably connected to rear ends of the main frames 21.

A support frame 35 (which is an example of the underframe UF) formed from a square-shaped steel pipe is arranged in a lateral orientation near rear portions of the left and right main frames 21. Flange portions 35A of left and right end portions of the support frame 35 are separably connected to the main frames 21 by flange bolts 35S. Further, a pair of left and right front mount supports 36 are formed on the support frame 35 to support the engine E.

It should be noted that is not necessary to use a plate material for the mount frame 31. The mount frame 31 can also be configured using a pair of left and right squared pipes. Further, it is also possible that the vertical frames 32 are not configured to have separable middle portions. For example, it is possible to have a configuration in which upper end portions of the vertical frames 32 are separably connected to the upper frames 24. It is also possible to have a configuration in which lower end portions of the vertical frames 32 are separably connected to the mount frame 31.

A lateral frame 37 is arranged in a lateral orientation, which is formed with steel and has two ends connected to the left and right upper frames 24, and is arranged to bridge the upper frames 24 near rear ends of the upper frames 24. An upper mount support 38 is provided at a middle position of the lateral frame 37 to support the transmission gear case MG in a form where the transmission gear case MG hangs from the upper mount support 38. Suspension support portions 37A are formed at two end portions of the lateral frame 37.

The above described main frames 21, mount frame 31, front frame 33, and support frame 35 are arranged at lower positions of the vehicle body frame F. Therefore, the main frames 21, mount frame 31, front frame 33, and support frame 35 can be collectively referred to as the underframe UF. As described above, the mount frame 31, the support frame 35, and the lower members 32B of the vertical frames 32 are separable with respect to other frames or frame members/units. Therefore, a portion of the underframe UF is configured to be separable from another or main portion of the underframe UF.

With respect to the lower members 32B of the vertical frames 32 on each of the left and right sides, base end portions of a pair of upper and lower rear suspension arms 39 configured as of a double wishbone type are supported in a manner swingable about longitudinally oriented swing axes. Further, lower ends of rear suspension units 41 are supported by the rear suspension arms 39. The rear suspension units 41 have rear suspension springs 40 that are compressed when the rear suspension arms 39 swing upward. Upper ends of the rear suspension units 41 are supported by the suspension support portions 37A of the lateral frame 37. The upper ends of the rear suspension units 41 may be supported by the upper frames 24. It is also possible that support brackets are provided on the upper frames 24 and the upper ends of the rear suspension units 41 are supported by the support brackets.

Figure 13:
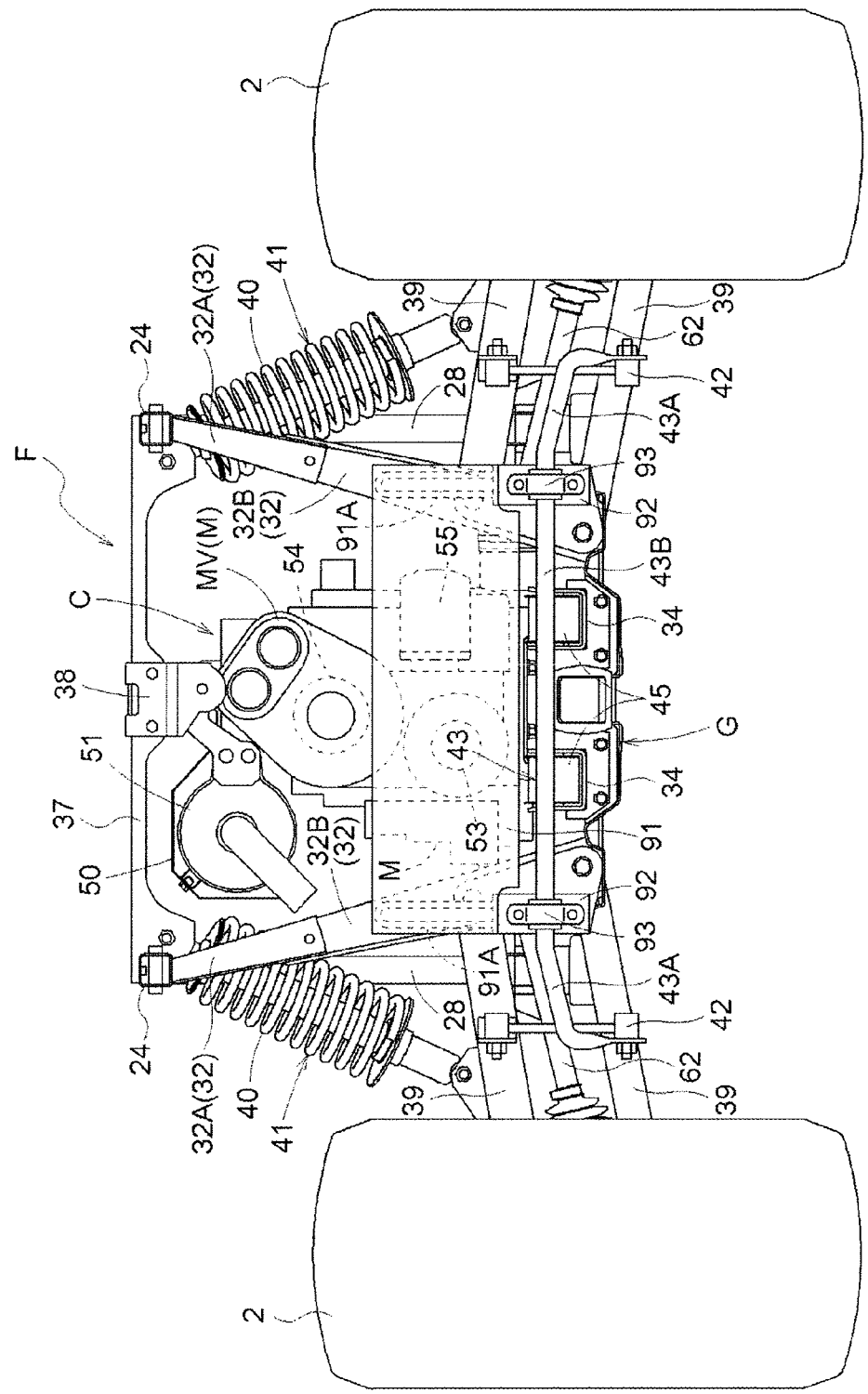
FIG. 13 is a rear view illustrating the detachable frame unit.

Moreover, as shown in FIG. 13, a rod-shaped stabilizer 43 can be utilized and can be connected at two ends via a link 42 to the upper of the pair of upper and lower rear suspension arms 39. A middle portion 43B of the stabilizer 43 is arranged at a position curving around the rear of the rear surface of the lower members 32B of the left and right vertical frames 32. The stabilizer 43 has a shape that includes on each of the two ends a forward-bending arm portion 43A and also includes the rod-shaped middle portion 43B. The middle portion 43B is supported in a torque or twist-operable manner, and is supported in a horizontal orientation on or by a pair of holders 93. The positional relationship of the holders 93 is described in more detail later on.

(Drive Unit)

As FIGS. 3, 6, 7, 9, and 10 show, the drive unit C can be configured with the engine E, the transmission gear case MG, and the continuously variable transmission MV integrated into a drive unit by connecting in the illustrated order the engine E, the transmission gear case MG, and the continuously variable transmission MV. Two lower left and right sites of a front end position of the engine E are supported in the pair of left and right front mount supports 36 of the support frame 35 by lower anti-vibration mounts 45. Two lower left and right sites of a rear end position of the transmission gear case MG are supported in the pair of left and right rear mount supports 34 of the mount frame 31 by the lower anti-vibration mounts 45. An upper end portion of a hanging frame 47 that protrudes on an upper surface of the transmission gear case MG is supported in the upper mount support 38 by an upper anti-vibration mount 48. The vehicle drive can thus use the engine E as a drive source; however, the work vehicle of the present invention may also use an electric motor as the drive source and may include a battery supplying electricity to the electric motor. The battery may be charged by a commercially available power source. For example, in order to charge the battery, the traveling vehicle body A may be provided with a generator driven by a compact engine.

The above-mentioned lower anti-vibration mounts 45 and the upper anti-vibration mount 48 can be configured with bush-type anti-vibration rubber, and function to inhibit vibration transmitted from the drive unit C to the vehicle body frame F. As shown in the drawings, the lateral width of the mount frame 31 is relatively short. Therefore, the distance between the left and right lower anti-vibration mounts 45 that support the transmission gear case MG is designed to be short, and a configuration is formed in which the upper end portion of the drive unit C is likely to vibrate in the lateral direction. With regard to this point, the transmission gear case MG is supported with respect to the lateral frame 37 in a form where the upper portion of the transmission gear case MG is hung on the upper anti-vibration mount 48, the lateral frame 37 being provided bridging the left and right upper frames 24. Therefore, the vibration of the drive unit C in the lateral direction can be inhibited.

Figure 10:
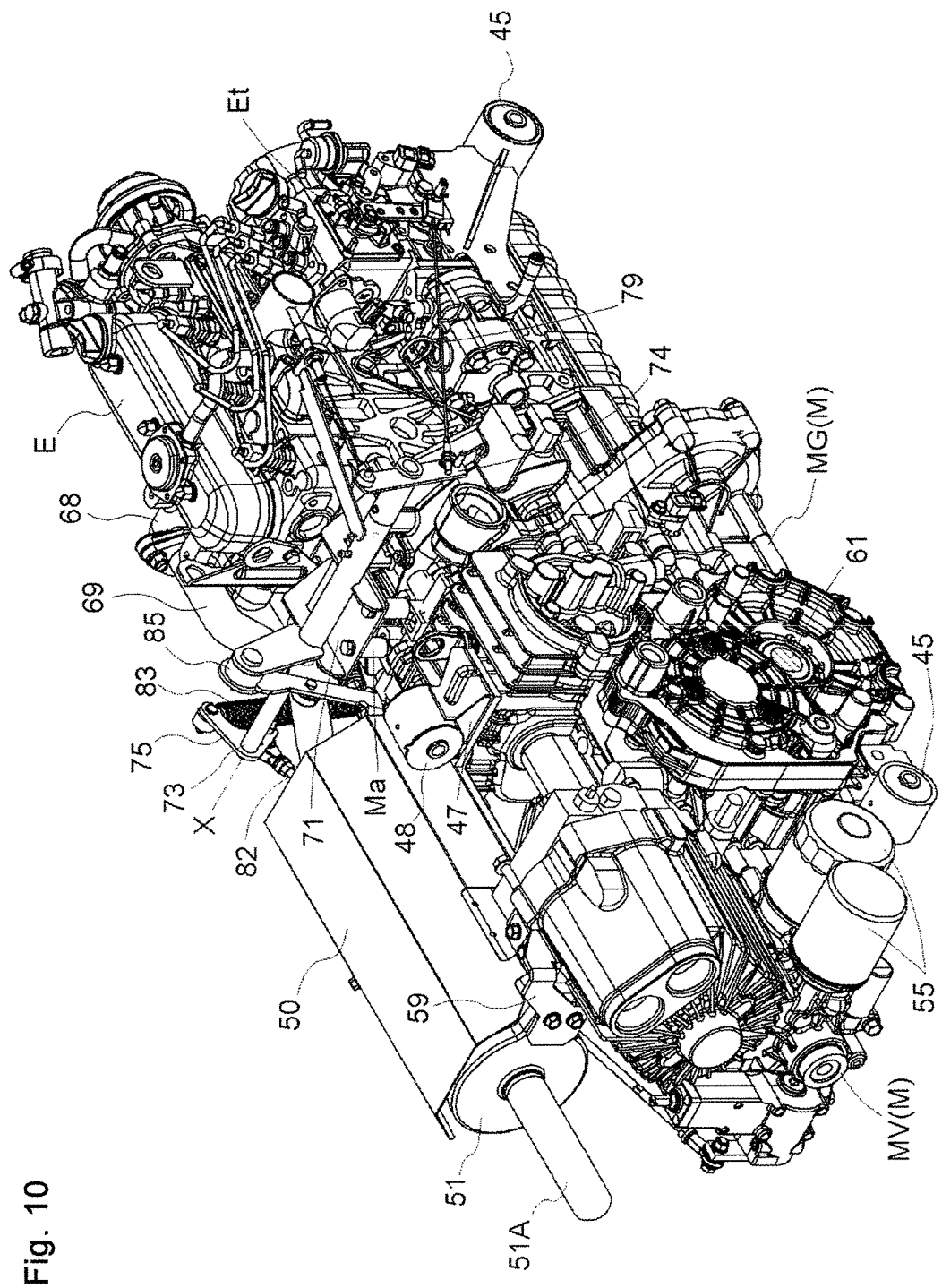
FIG. 10 is a perspective view of the drive unit and the speed change operation structure.
Figure 11:
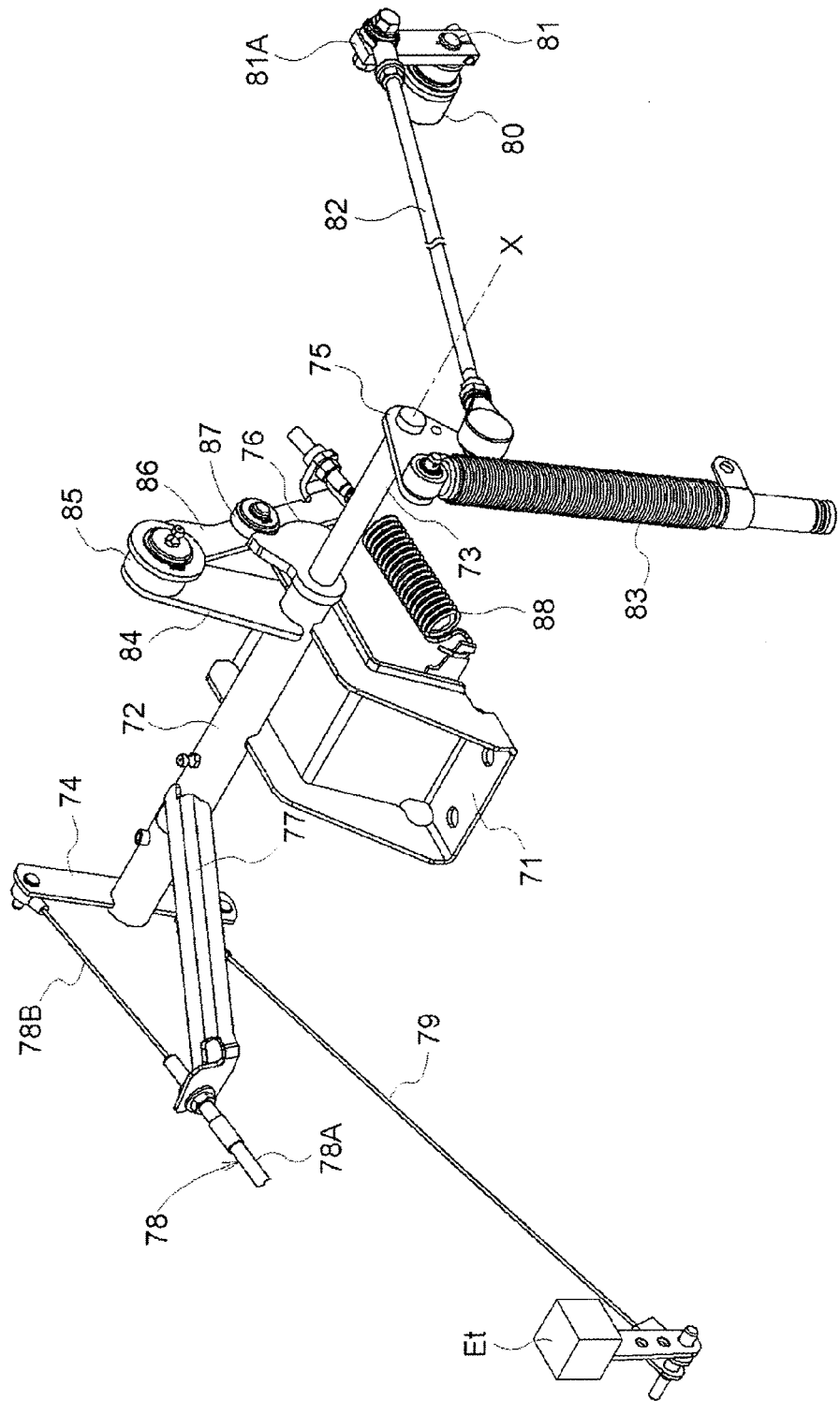
FIG. 11 is a perspective view of the speed change operation structure.

As shown in FIG. 10, a muffler 51 having a cover 50 on an upper surface thereof can be utilized for protection against heat and can be provided on a left side at an upper position of the transmission gear case MG to reduce exhaust sound of the engine E.

An internal structure of the transmission gear case MG is not illustrated in the drawings. However, the transmission gear case MG has built-in a gear-type transmission and a differential gear (not illustrated in the drawings), the transmission speed-changing a driving force speed-changed by the continuously variable transmission MV into a plurality of speeds and performing forward and backward switching.

Figure 7:
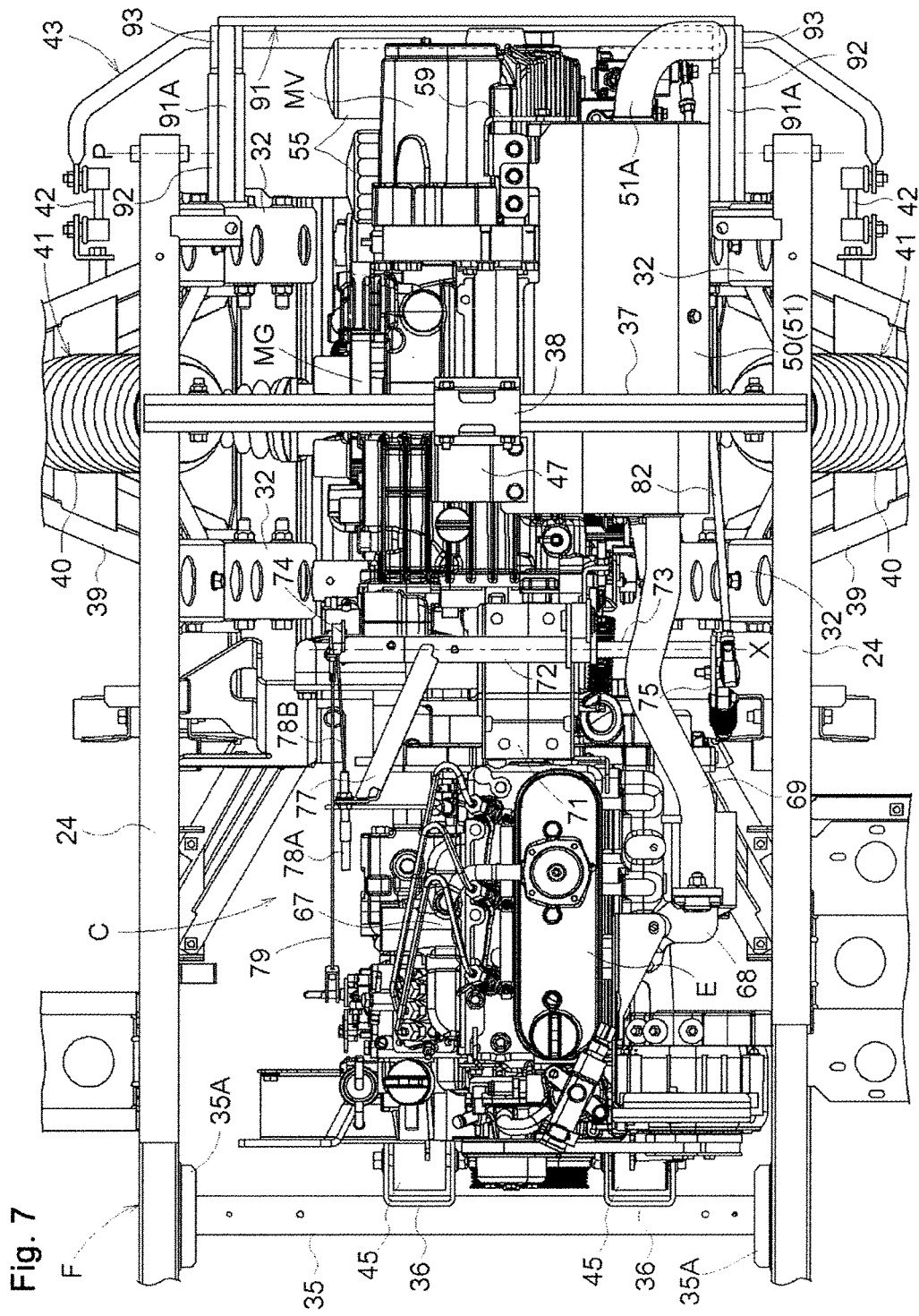
FIG. 7 is a plan view of the drive unit.

As shown in FIG. 6, the continuously variable transmission MV can include a hydraulic pump 53 of a variable capacity, axial plunger type, which operates by using a driving force from the engine E, and a hydraulic motor 54 of an axial plunger type, which rotates by using hydraulic oil supplied from the hydraulic pump 53. As FIGS. 7 and 10 illustrate, on a lateral surface of a rear portion of the continuously variable transmission MV, two oil filters 55 can be used for filtering the hydraulic oil and are detachably provided. One of the two oil filters 55 is arranged on a suction side to suck the hydraulic oil into the hydraulic pump 53, and the other is arranged on a drain side to drain the hydraulic oil. In the present invention, a belt-type CVT or a toroidal CVT may also be used as the continuously variable transmission MV configuring the transmission case M.

In the drive unit C, a transmission system is configured in which the engine E is provided in a manner that an axis of an output shaft (crankshaft: not illustrated in the drawings) thereof is configured in the longitudinal direction. The driving force from the engine E can thus be transmitted to the hydraulic pump 53 of the continuously variable transmission MV by passing a transmission shaft (not illustrated in the drawings) coupled to the output shaft through the transmission gear case MG in the longitudinal direction. A driving force from the hydraulic motor 54 of the continuously variable transmission MV is then transmitted to the transmission gear case MG. Further, in the transmission gear case MG, the transmission system is configured in a manner that the driving force is speed-changed by the transmission, is transmitted to left and right rear output shafts 61 from the differential gear, and is transmitted from the rear output shafts 61 via rear wheel drive shafts 62 to the left and right rear wheels 2. In addition, as FIG. 3 illustrates, the driving force is transmitted from a lower output shaft (not illustrated in the drawings) formed at a lower surface side and a drive shaft 63 to a front wheel differential gear 64, and is further transmitted from front wheel drive shafts 65 to the left and right front wheels 1.

In particular, in order to avoid contact between the drive shaft 63 and an oil pan on a lower portion of the engine E, a center position of the engine E in the lateral direction is arranged to be offset to the left side with respect to a center position of the transmission gear case MG in the lateral direction. It is also possible that the center position of the engine E in the lateral direction is arranged to be deviated or offset to the right side with respect to the center position of the transmission gear case MG in the lateral direction and for the drive shaft 63 to be arranged on the left side of the lower portion of the engine E.

As FIGS. 6 and 13 illustrate, the continuously variable transmission MV is configured in a manner that the hydraulic pump 53 is arranged at a lower side and the hydraulic motor 54 is arranged at an upper side of the continuously variable transmission MV. In this configuration, an upper end level of the continuously variable transmission MV is configured to be at a position higher than an upper surface of the transmission gear case MG. The upper end of the continuously variable transmission MV protrudes above the upper surface of the transmission gear case MG. In order to reduce an amount of the upward protrusion of the continuously variable transmission MV and to enlarge a configuration space for the muffler 51 on the left side portion of the upper portion of the continuously variable transmission MV, the continuously variable transmission MV is configured to be in an inclined state in a manner that the upper end side of the continuously variable transmission MV is displaced toward the right side (outside) as viewed in the longitudinal direction. It is also possible to have a configuration in which the continuously variable transmission MV is configured to be in an inclined state in a manner that the upper end side of the continuously variable transmission MV is displaced toward the left side (outside) as viewed in the longitudinal direction, and also that the muffler 51 is arranged on the right side of the continuously variable transmission MV. Further, it is also possible to arrange the muffler 51 outside of the vehicle body frame F.

The continuously variable transmission MV is arranged at a position such that a rear end portion of the continuously variable transmission MV protrudes slightly backward from a rear end of the vehicle body frame F. As FIGS. 5, 7, and 13-15 illustrate, a guard member 91 protecting the rear end portion of the continuously variable transmission MV is located at the rear end of the vehicle body frame F. The guard member 91 has the shape of a plate and is provided in a vertical orientation to the rear of the transmission case M. Forward-projecting guard stays 91A are provided on outside end positions on the left and right of the guard member 91. The pair of guard stays 91A are separably connected by bolts to the rear surface of the lower members 32B of the vertical frames 32 at rear left and right positions. In this configuration, by separating the pair of guard stays 91A from the vertical frames 32, the guard member 91 and the guard stays 91A are separated from the vehicle body frame F. This facilitates changing of the oil filters 55 and allows for easier maintenance of the continuously variable transmission MV. In addition, the guard stays 91A use a pipe frame molded or bent on an upper side, and are configured by integrally connecting a plate member molded to be folded on a lower side. Moreover, the guard member 91 and block members 92 are detachably mounted with bolts to the vehicle body frame F.

Further, the block members 92 can be detachably mounted with bolts to a lower side of a connection position of the guard stays 91A on the rear surface of the lower members 32B of the left and right vertical frames 32. In addition, the holders 93 are detachably mounted with bolts to the rear surface of the pair of block members 92. The pair of holders 93 are arranged, in plan view, at a location forward of the guard member 91 and to the rear of the rear end of the transmission case M (or continuously variable transmission MV). Further, the pair of holders 93 are arranged, in a lateral view, on the lower side of the guard member 91.

Figure 14:
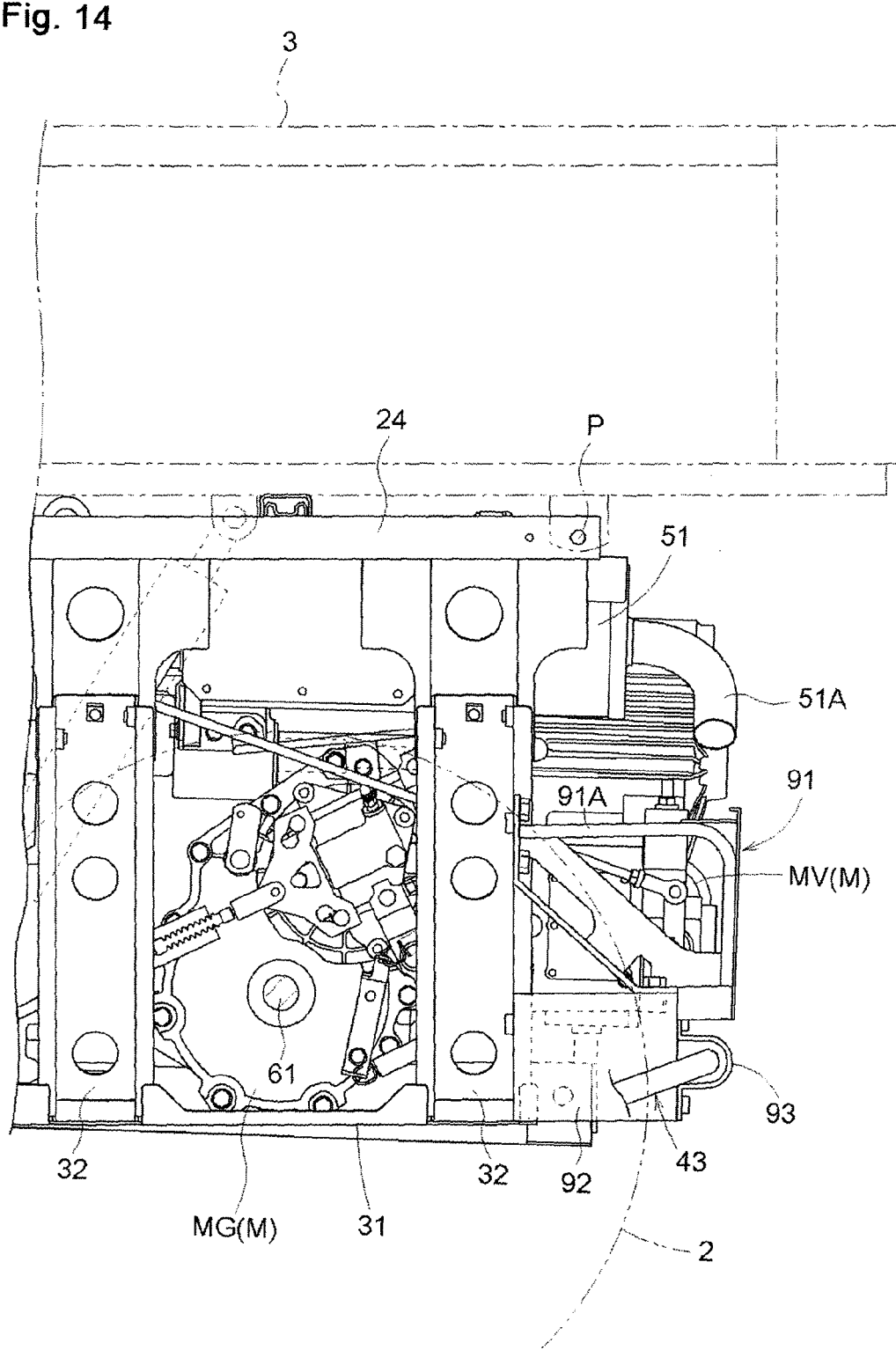
FIG. 14 is a side view of a rear portion of the traveling vehicle body.
Figure 15:
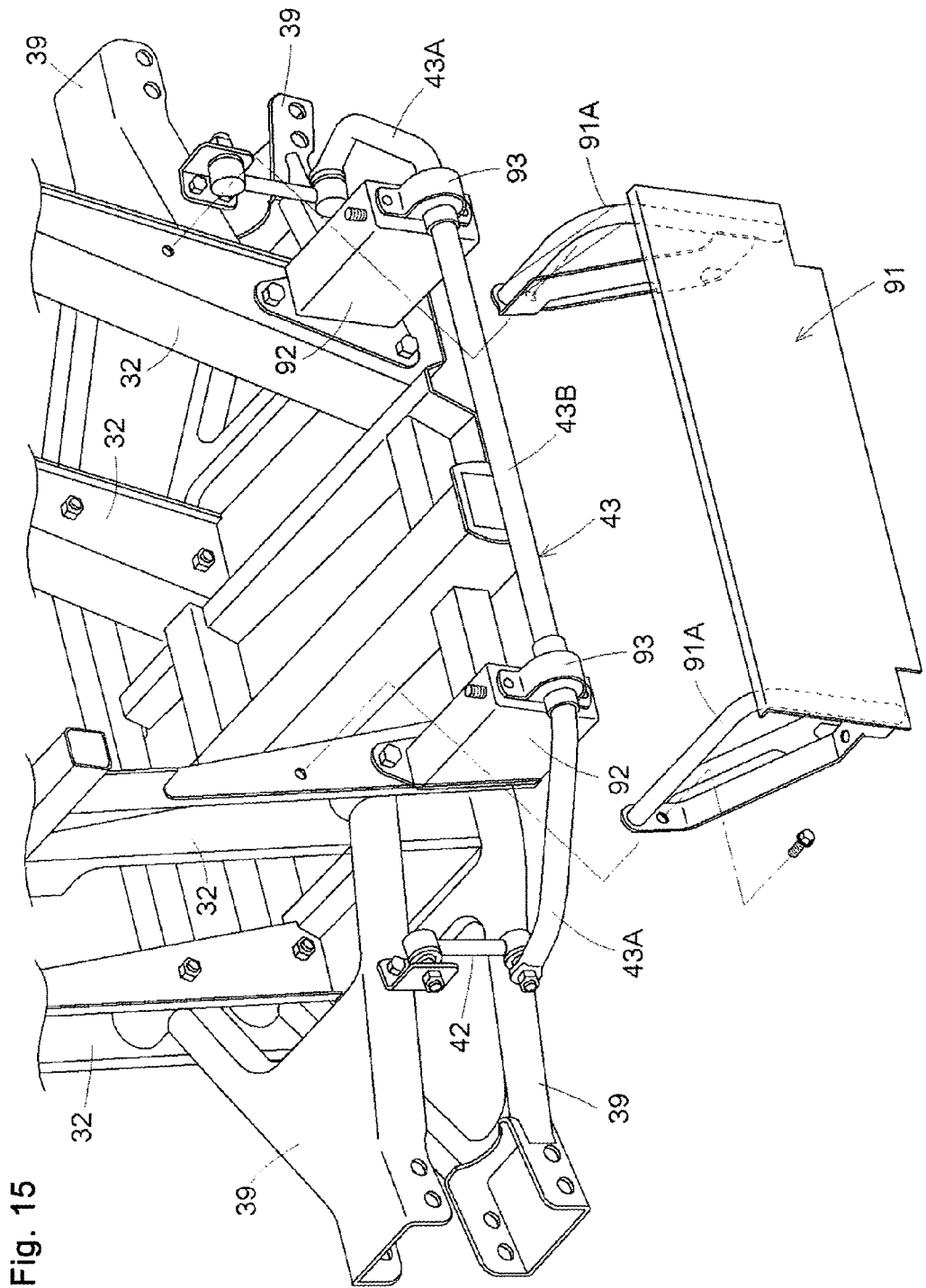
FIG. 15 is a perspective view of the rear portion of the traveling vehicle body.

By providing the stabilizer 43 in the manner shown in FIGS. 7 and 13, the stabilizer 43 can be arranged in a broad space opened up to the rear of the rear end of the vehicle body frame F (the rear ends of the vertical frames 32) and below the guard member 91, thus facilitating assembly. Moreover, when considering a configuration in which the stabilizer 43 is inserted through a space on a front side of the vertical frames 32, for example, the transmission case M is arranged at a front position of the vertical frames 32, and thus reserving space for arranging the stabilizer 43 in this space is difficult. However, the stabilizer 43 can be arranged as illustrated in FIGS. 13-15.

A pair of holders 93 support the stabilizer 43 in a horizontal orientation on the pair of rear suspension arms 39 via the links 42. The stabilizer 43 is connected at two ends to the pair of holders 93. By supporting the stabilizer 43 with the pair of holders 93, the axis of the middle portion 43B aligns with the horizontally oriented twisting axis and the stabilizer 43 is supported in a manner rotatable about the twisting axis. As a result, when an outside force vertically displaces one of the right and left rear wheels 2, a sudden up-down movement of the rear wheels 2 is inhibited by the rear suspension unit 41 and the stabilizer 43.

Figure 9:
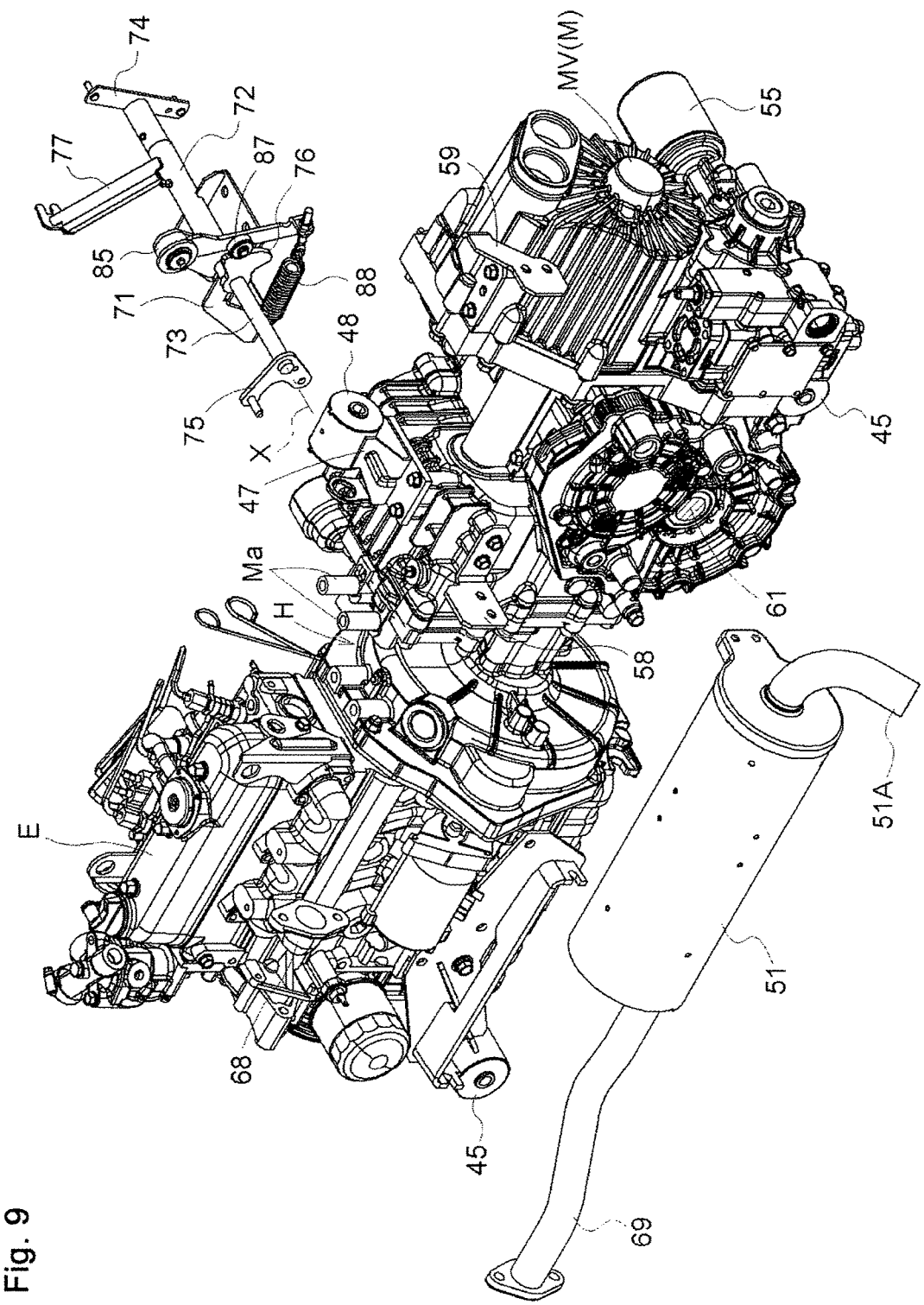
FIG. 9 is a perspective view of a state in which a speed change operation structure is separated from the drive unit.

As FIGS. 7, 9, and 10 show, the engine E can include an intake manifold 67 on the right side of the upper surface thereof supplying air from an air cleaner (not illustrated in the drawings) and can also include an exhaust manifold 68 on the left side. An exhaust pipe 69 is arranged between the exhaust manifold 68 and the muffler 51.

The muffler 51 can have a cylindrical shape, and is provided with a curved cylindrical exhaust portion 51A at a rear end to discharge exhaust gas downward and to the left. A front end portion of the muffler 51 is supported on an upper surface of the transmission gear case MG by a front bracket 58 and a rear end portion of the muffler 51 is supported on an upper surface of the continuously variable transmission MV by a rear bracket 59. The cover 50 for protection against heat has a front end portion supported by a screw and the like on the upper surface of the transmission gear case MG and a rear end portion supported by a screw and the like on the upper surface of the continuously variable transmission MV. Further, the above described exhaust portion 51A is arranged at a position where the exhaust portion 51A does not contact the cargo bed 3 when the cargo bed 3 is raised, and the exhaust direction of the exhaust portion 51A is configured in a manner that the exhaust gas is discharged to a space where no parts exist in its neighborhood. Although not illustrated in the drawings, the front bracket 58 supporting the front end portion of the muffler 51 and the rear bracket 59 supporting the rear end portion of the muffler 51 are fixed with respect to screw holes formed on the muffler 51 with screws and the like. Elongated holes, through which screws fixing the muffler 51 to the transmission gear case MG are inserted, are formed in different orientations on the front bracket 58 and the rear bracket 59. By configuring the orientations of the elongated holes this way, dimensional errors of the muffler 51, errors of mounting positioning, and the like are absorbed to facilitate mounting.

As described above, the upper frames 24, the mount frame 31, and the left and right vertical frames 32 are arranged in a manner that the rear end portion of the vehicle body frame F forms an inverted trapezoid as viewed from the rear. Then, the continuously variable transmission MV is arranged in an inclined manner such that the upper portion of the continuously variable transmission MV is displaced rightward (see FIG. 8). On the left side of the upper portion of the continuously variable transmission MV, inside a corner portion on the left side of the upper portion of the inverted trapezoid, and in a vicinity of the lower side of the lateral frame 37, the muffler 51 is arranged. By doing so, the internal space of the vehicle body frame F can be effectively used. Further, as FIG. 7 illustrates, in plan view, the muffler 51 can be arranged in a vicinity of the lateral frame 37 at a position overlapping the lower side of the lateral frame 37, and the muffler 51 is arranged at a position overlapping the upper side of the rear wheel drive shaft 62. As described above, the muffler 51 may also be arranged on the right side inside the vehicle body frame F. Also in such an arrangement, the muffler 51 is arranged at a position overlapping the upper side of the rear wheel drive shaft 62.

Advantageously, most of the upper surface of the muffler 51 can be covered by the cover 50, and letters such as "HOT" (not illustrated in the drawings) can be formed as projections on the cover 50 by press working. Further, on the cover 50, by opening a portion of the letters and the like formed as projections by press working, rainwater and the like are unlikely to accumulate on the upper surface; and by forming convex-concave portions by press working, the surface area of the cover 50 is enlarged and a heat radiation effect is enhanced, and at the same time, strength is increased. The muffler 51 is fixedly connected to the rear end of the exhaust pipe 69. Even after the muffler 51 is attached to members in the vicinity of the transmission gear case MG and the like, the exhaust pipe 69 and the muffler 51 are configured to be integrally detachable.

(Detachment of Drive Unit)

In the configuration as described above, by separating the drive unit C, together with the detachable frame unit G and the support frame 35, from the vehicle body frame F, and by separating the location or site of the upper anti-vibration mount 48, the drive unit C can be detached so as to be withdrawn downward or lowered.

The whole vehicle body frame F can also be lifted up; then, by removing the insertion bolts 33S, the brackets 33A of the front frame 33 can be separated from the main frames 21. Moreover, by removing the connecting bolts 32S, the lower members 32B can be separated from the upper members 32A, which constitute the left and right vertical frames 32 (separating the detachable frame unit G). Further, by removing the flange bolts 35S, the flange portions 35A on the two ends of the support frame 35 can be separated from the main frames 21. Next, by separating the site of the upper anti-vibration mount 48, the upper ends or rear ends of the rear suspension units 41 are separated.

By performing this separation, the engine E can still be in a state of being supported on the support frame 35 by the lower anti-vibration mounts 45, and the transmission gear case MG is in a state of being supported on the mount frame 31 by the lower anti-vibration mounts 45. As FIG. 13 illustrates, the drive unit C, including the engine E, the transmission gear case MG, and the continuously variable transmission MV, can be integrally detached (or detached as a unit) from the vehicle body frame F by being moved downwardly. Further, the muffler 51 is provided in the drive unit C and the rear wheels 2 are supported on the left and right vertical frames 32 via the rear suspension arms 39. Therefore, these parts can also be detached downward together with the drive unit C.

The engine E, the transmission gear case MG, and the continuously variable transmission MV are heavy, so it is advantageous that these members can be detached from the vehicle body frame F in a form of being moved downward. Therefore, as compared to a case where these members are detached in a form of being lifted upward, detachment can also be performed in a form of using a hydraulic jack to lower these members downward, for example, without the need for lifting equipment. Further, in this work vehicle, it is also possible to adopt a configuration in which the front frame 33 is not connected to the main frames 21. By adopting such a configuration, time and effort can be reduced when separating the mount frame 31.

(Speed Change Operation Structure)

As FIGS. 6, 7 and 9-11 illustrate, the engine E and a lower position of the transmission gear case MG are connected, and a gap H is thus formed at an upper position between the two members. A coupling member 71 is arranged at a position straddling over the top of the gap H, crossing over an upper surface of a rear portion of the engine E and projecting portions Ma protruding upward at a front portion of the transmission gear case MG. A front end of the coupling member 71 is bolt-connected to the engine E, and a rear end of the coupling member 71 is bolt-connected to the projecting portions Ma of the transmission gear case MG. This connection enhances the coupling strength between the engine E and the transmission gear case MG.

At an upper position of the coupling member 71, a tubular body 72 is provided coaxial with a middle axis X in a lateral orientation. A middle actuation shaft 73 is rotatably supported with respect to the tubular body 72 in a manner fitted therein. A middle position of a plate-shaped input arm 74 connects to an end portion on a right side of the middle actuation shaft 73. A bell crank shaped output arm 75 connects to an end portion on a left side of the middle actuation shaft 73. A neutral cam 76 connects to a middle portion of the middle actuation shaft 73.

An arm-shaped stay 77 is fixedly provided on the outside surface of the tubular body 72. An end portion of an outer wire 78A of an operation wire 78 is supported by the stay 77, the operation wire 78 as a first operation device being linked to the accelerator pedal 16 as a speed change operation device. Further, an end portion of an inner wire 78B of the operation wire 78 connects to one end portion of the input arm 74. A speed control rod 79 connects to the other end portion of the input arm 74, the speed control rod 79 as a third operation device transmitting an actuating force of the input arm 74 to a throttle mechanism Et of the engine E.

A speed change operation part 80 is arranged on a left side surface of the continuously variable transmission MV. A speed change operation arm 81A is provided for swinging a speed change operation shaft 81 that protrudes from the speed change operation part 80 in a horizontal orientation. The speed change operation arm 81A in a neutral orientation illustrated in FIG. 6 shuts off hydraulic oil supplied from the hydraulic pump 53 to the hydraulic motor 54 to stop traveling. By swinging the speed change operation arm 81A, the hydraulic oil supplied from the hydraulic pump 53 to the hydraulic motor 54 is increased and an increase in traveling speed is realized.

Figure 12:
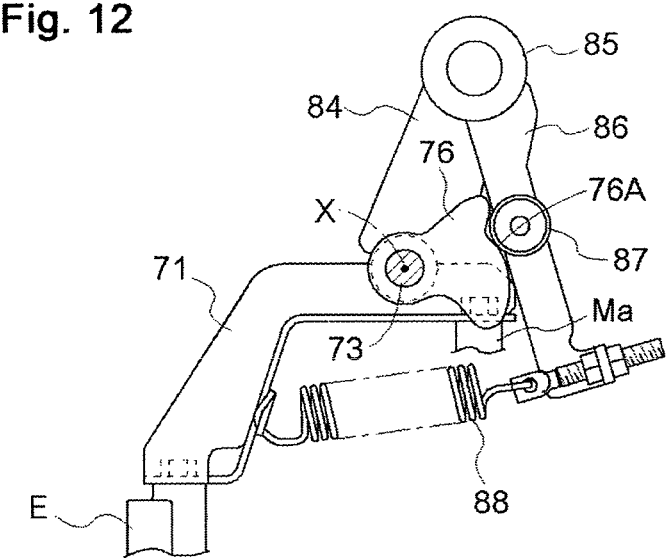
FIG. 12 is a side view of the speed change operation structure.

One end portion of an operation rod 82 connects to the speed change operation arm 81A, and the other end portion of the operation rod 82 connects to one arm of the output arm 75. An oil or hydraulic fluid damper 83 for inhibiting rapid actuation of the speed change operation arm 81A connects to the other end portion of the output arm 75. As FIG. 12 illustrates, a concave cam surface 76A is formed on an outer periphery of the neutral cam 76. A neutral return arm 86 is supported on a support part 85 of a projecting end of an arm body 84 fixedly provided on the tubular body 72, in a manner swingable about an axis parallel to the middle axis X (see FIG. 11). An abutment member 87 formed from an idling roller engageable with the cam surface 76A of the neutral cam 76 is supported on the neutral return arm 86. A biasing force of a neutral return spring 88 acts on a swinging end of the neutral return arm 86.

According to this speed change operation structure, when the accelerator pedal 16 is depressed, the inner wire 78B is pulled, and both the input arm 74 and the middle actuation shaft 73 rotate about the middle axis X. Along with the rotation of the input arm 74, the speed control rod 79 is pulled, and, with this operation force, the throttle mechanism Et is operated in an acceleration direction and an engine rotation speed is increased. Further, the output arm 75 rotates integrally with the rotation of the middle actuation shaft 73 caused by the depression operation of the accelerator pedal 16. By a pushing operation of the operation rod 82 linked to this rotation, the speed change operation arm 81A is operated in an acceleration direction and the continuously variable transmission MV performs acceleration. That is, in conjunction with the depression operation of the accelerator pedal 16, traveling speed can be increased by increasing the driving speed of the continuously variable transmission MV, while inhibiting engine stall by increasing the engine rotation speed.

Further, when the depression operation of the accelerator pedal 16 is released, the tension acting on the inner wire 78B from the accelerator pedal 16 is largely reduced. Due to the biasing force of the neutral return spring 88 that acts on the neutral return arm 86, the abutment member 87 presses against and enters into the cam surface 76A of the neutral cam 76. Thereby, the middle actuation shaft 73 returns to a neutral position and the speed change operation arm 81A returns to the stop position; in addition, the throttle mechanism Et also returns to a deceleration position, and the traveling vehicle body A stops.

Specifically, in this speed change operation structure, the operation wire 78 as the first operation device transmitting the depression operation force of the accelerator pedal 16 is arranged on the right side of the vehicle body. The operation rod 82 as the second operation device transmitting the operation force of the operation wire 78 to the speed change operation part 80 on the left side of the continuously variable transmission MV is arranged on the left side of the vehicle body. The speed control rod 79 as the third operation device transmitting the speed change operation force of the operation wire 78 to the throttle mechanism Et on the right side of the engine E is arranged on the right side of the vehicle body. From this arrangement, using a configuration in which the middle actuation shaft 73 rotates about the middle axis X, the speed change operation is performed by effectively utilizing the spaces on the two sides of the drive unit C. In this speed change operation structure, it is also possible that the operation wire 78 and the like, as the first operation device, are arranged on the left side of the vehicle body, and the operation rod 82 and the like, as the second operation device, are arranged on the right side of the vehicle body. Further, an operation system operating the throttle mechanism Et may be arranged on either the left or right side of the vehicle body.

(Other Embodiments)

In addition to the above-described embodiments, the present invention may also be configured as follows.

Figure 16:
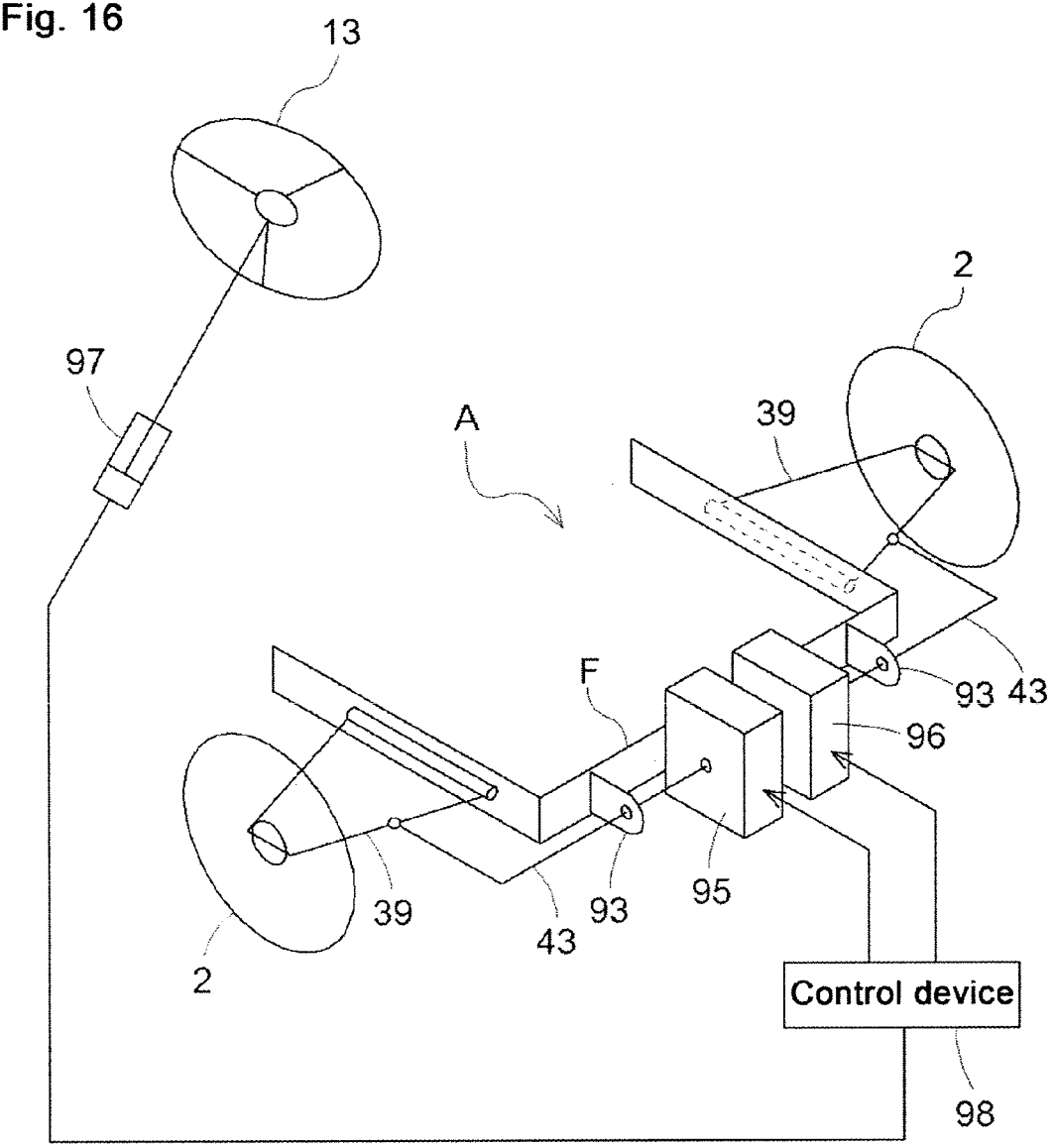
FIG. 16 is a perspective view illustrating a control configuration according to another non-limiting embodiment.

In the embodiment of FIG. 16, the middle portion of the stabilizer system can be separated into two portions on the left and right, which are used as the stabilizer 43. A left electromagnetic clutch 95 is arranged on or coupled to an inside end of the left side stabilizer 43 while a right electromagnetic clutch 96 is arranged on or coupled to an inside end of the right side stabilizer 43. The corresponding inside ends of the stabilizer 43 are configured to be connected to the vehicle body frame F in a state where the left and right electromagnetic clutches 95 and 96 are ON and to be separated from the vehicle body frame F in an OFF state. Further, a steering sensor 97 detecting a steering direction of the steering wheel 13 and a control device 98 controlling the left and right electromagnetic clutches 95 and 96 based on detection results of the steering sensor 97 are provided.

In the above-noted embodiment, when the steering wheel 13 is operated to turn the traveling vehicle body A, the control device 98 performs a control to operate only the turn-interior side of the left and right electromagnetic clutches 95 and 96 to turn OFF such that only the stabilizer 43 on the turn-exterior side acts. That is, when the steering sensor 97 detects that the steering wheel 13 has been operated in the left direction, the ON state of the right electromagnetic clutch 96 is maintained and the left electromagnetic clutch 95 is switched OFF so that only the right side stabilizer 43 acts. Further, when the steering sensor 97 detects that the steering wheel 13 has been operated in the right direction, control is exerted so that the ON state of the left electromagnetic clutch 95 is maintained and the right electromagnetic clutch 96 is switched OFF, and thus only the left side stabilizer 43 acts.

By performing this control, a phenomenon is prevented in which a force acts on the rear wheel 2 on the turn-interior side in a direction lifting away from the stabilizer 43 in conjunction with compression of the rear wheel 2 on the turn-exterior side when the traveling vehicle body A turns. The rear wheel 2 on the turn-interior side thus has appropriate contact with the ground and maintains necessary grip, thus stabilizing the orientation of the traveling vehicle body A.

According to another embodiment, the guard member 91 and the holders 93 are integrally connected, i.e., the guard stays 91A on the guard member 91 and the holders 93 (which may also be integral with the block members 92) are made integral. By being integral, time and effort involved in assembly can be reduced.

The present invention is advantageously applicable to a work vehicle having a transmission case arranged at a rear end position of a vehicle body frame.

It is noted that the foregoing examples have been provided merely for the purpose of explanation and are in no way to be construed as limiting of the present invention. While the present invention has been described with reference to exemplary embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular structures, materials and embodiments, the present invention is not intended to be limited to the particulars disclosed herein; rather, the present invention extends to all functionally equivalent structures, methods and uses, such as are within the scope of the appended claims.

The present invention is not limited to the above described embodiments, and various variations and modifications may be possible without departing from the scope of the present invention.

What is claimed is:
1. A work or utility vehicle comprising:
 a drive source;
 a vehicle body frame;
 left and right front wheels supported on the vehicle body frame;
 left and right rear wheels supported on the vehicle body frame;
 a transmission case supported on the vehicle body frame and transmitting a driving force from the drive source to at least the left and right rear wheels;
 left and right vertical frames arranged in a rear frame section of the vehicle body frame;
 at least one left and right suspension arm movably coupled to a respective one of the left and right vertical frames;
 a detachably mounted guard member protecting the transmission case and having a protecting portion disposed behind the left and right vertical frames;
 an upper end of the guard member being arranged below an upper end of the left and right vertical frames;

the protecting portion being located such that an imaginary horizontal line oriented along a front and back direction of the vehicle body frame passes through the transmission case and a vertical center of the protecting portion;
a stabilizer supported at two ends by suspension arms of the left and right rear wheels and being arranged in a position that is lower than the guard member; and
the stabilizer being arranged closer to a lower end than to an upper end of the left and right vertical frames,
wherein the protecting portion of the guard member is structured and arranged to overlie and protect a rear side of the transmission case and the stabilizer is arranged forwardly of the protecting portion.

2. The vehicle of claim 1, wherein the protecting portion of the guard member is a plate material and the guard further comprises left and right protruding stays which are each configured to be detachably connected.

3. The vehicle of claim 1, wherein the stabilizer comprises a middle portion supported in a generally horizontal manner via holders.

4. The vehicle of claim 1, wherein the vehicle body frame comprises a main frame section and the rear frame section and said rear frame section is detachably connected to the main frame section.

5. The vehicle of claim 4, wherein the rear frame section is sized and configured to support the drive source and the transmission case.

6. The vehicle of claim 5, wherein the rear frame section is sized and configured to support the left and right rear wheels.

7. The vehicle of claim 4, wherein, separation of the rear frame section, allows for removal from the vehicle of a subassembly comprising at least the rear frame section, the drive source, the transmission case, and the left and right rear wheels.

8. The utility vehicle of claim 1, wherein a center portion of the stabilizer is supported by left and right holders which are each respectively coupled, via a support member, to the left and right vertical frames.

9. The utility vehicle of claim 1, wherein a torsion axis of the stabilizer is vertically located closer to lower ends of the left and right vertical frames than to upper ends of the left and right vertical frames.

10. The utility vehicle of claim 1, wherein the suspension aims are left and right upper suspension arms and a center portion of the stabilizer is vertically disposed below vehicle frame connecting ends of the left and right upper suspension arms.

11. A utility vehicle comprising:
a vehicle body frame comprising a main frame section and a separable rear frame section;
left and right front wheels supported on the vehicle body frame;
left and right rear wheels supported on the vehicle body frame;
a drive source and a transmission case supported on the separable rear frame section and providing drive power to each of the left and right front and rear wheels;
a guard member protecting the transmission case and having left and right connecting portions;
the guard member:
when installed, being in a position behind a filter or the transmission case; and
being detachable to facilitate filter or transmission maintenance;
the left connecting portion being detachably coupled to a left vertical frame of the rear frame section and the right connecting portion being detachably coupled to a right vertical frame of the rear frame section;
an upper end of the guard member being arranged below an upper end of the left and right vertical frames;
a stabilizer arranged behind left and right vertical frames, being supported at two ends by suspension arms of the left and right rear wheels, and being arranged in a position that is lower than the guard member; and
the stabilizer being arranged closer to a lower end than to an upper end of the left and right vertical frames.

12. The utility vehicle of claim 11, wherein the stabilizer is arranged forwardly of the guard member.

13. The utility vehicle of claim 11, wherein the stabilizer is supported by left and right holders, the left holder being coupled, via a support, to the left vertical frame and the right holder being coupled, via a support, to the right vertical frame.

14. The utility vehicle of claim 11, wherein a torsion axis of the stabilizer is vertically located at a position below vehicle frame mounting ends of the suspension arms and said suspension arms are left and right upper suspension arms.

15. The utility vehicle of claim 14, wherein the suspension arms are upper left and right suspension arms respectively connected to the left and right vertical frames.

16. A utility vehicle comprising:
a vehicle body frame comprising a main frame section and a separable rear frame section;
left and right front wheels supported on the vehicle body frame;
left and right rear wheels supported on the separable rear frame section of the vehicle body frame;
a drive source and a transmission case supported on the separable rear frame section;
a guard member structured and arranged to overlie and protect a rear side of the transmission case;
an upper end of the guard member being arranged below an upper end of the left and right vertical frames;
the guard member being located adjacent the transmission case and being removably mounted so as to facilitate maintenance;
a stabilizer supported at two ends by suspension arms of the left and right rear wheels and being arranged in a position that is lower than the guard member; and
the stabilizer being arranged closer to a lower end than to an upper end of the left and right vertical frames,
wherein a torsion axis of the stabilizer is vertically located at least one of:
at a position between vehicle frame mounting ends of left and right upper suspension arms and vehicle frame mounting ends of left and right lower suspension arms; and
at a position below vehicle frame mounting ends of left and right upper suspension arms.

17. The utility vehicle of claim 16, wherein the stabilizer is arranged forwardly of the guard member.

18. The utility vehicle of claim 16, wherein the guard member has left and right connecting portions releasably connected to portions of the rear frame section.

19. A work or utility vehicle comprising:
a drive source;
a vehicle body frame;
left and right front wheels supported on the vehicle body frame;

left and right rear wheels supported on the vehicle body frame via left and right suspension arms;
a transmission case arranged behind left and right vertical frames of the vehicle body frame and transmitting a driving force from the drive source to at least the left and right rear wheels;
a guard member that is detachable to facilitate maintenance and protecting the transmission case;
an upper end of the guard member being arranged below an upper end of the left and right vertical frames;
a protecting portion of the guard member being spaced from and located behind lower end portions of the left and right vertical frames;
a stabilizer being arranged in a position that is lower than the guard member and comprising:
  a main portion spaced from and located behind lower end portions of the left and right vertical frames; and
  left and right ends respectively coupled to the left and right suspension arms; and
the stabilizer being arranged closer to a lower end than to an upper end of the left and right vertical frames.

\* \* \* \* \*